United States Patent
Pietrzak et al.

(10) Patent No.: US 6,205,240 B1
(45) Date of Patent: *Mar. 20, 2001

(54) OPTICAL PROFILE SENSOR

(75) Inventors: Kenneth A. Pietrzak, Uncasville; Leroy G. Puffer, Vernon; Farooq Bari, Manchester, all of CT (US)

(73) Assignee: United Technologies Corporation, Hartford, CT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/972,273

(22) Filed: Nov. 18, 1997

Related U.S. Application Data

(62) Division of application No. 08/801,336, filed on Feb. 19, 1997.

(51) Int. Cl.$^7$ .............. G06K 9/48; G06K 9/60; G06T 3/60; G01B 11/24
(52) U.S. Cl. .............. 382/152; 382/219; 382/296; 356/376; 356/393; 250/559.22; 250/559.39
(58) Field of Search .............. 382/141, 152, 382/154, 165, 173, 219, 288, 291, 294, 295, 296, 142; 356/69, 376, 392, 393, 397, 237.1; 250/559.22, 559.27, 559.39, 559.46; 73/104; 345/431, 437, 438, 441; 33/546, 547; 353/80

(56) References Cited

U.S. PATENT DOCUMENTS

| | | | |
|---|---|---|---|
| 3,837,198 | 9/1974 | Higgins | 72/9 |
| 4,226,536 | 10/1980 | Dreyfus et al. | 356/376 |
| 4,477,926 | * 10/1984 | Linger et al. | 382/149 |
| 4,531,837 | 7/1985 | Panetti | 356/376 |
| 4,563,095 | 1/1986 | Puffer | 356/430 |

(List continued on next page.)

FOREIGN PATENT DOCUMENTS

| | | |
|---|---|---|
| WO 91/08439 | 6/1991 | (WO) . |
| WO 96/00159 | 1/1996 | (WO) . |

OTHER PUBLICATIONS

SPIE, vol. 1194, Proceedings of the SPIE Conf. on Optics, Illumination, and Image Sensing for Machine Vision IV, Nov. 8–10, 1989, "An Accurate Calibration Technique for 3–D Laser Stripe Sensors" by Marianne Chiarella and Kenneth A. Pietrzak, Philadelphia PA, pp. 176–185.

(List continued on next page.)

*Primary Examiner*—Leo H. Boudreau
*Assistant Examiner*—Brian P. Werner

(57) ABSTRACT

An apparatus for determining the profile of an object provides a sensor having at least one light source which projects a sheet of light that is intersected by the object, whereby a stripe of points on the object are illuminated. The light source projects the sheet from multiple angles, so that the resulting stripe represents a continuous profile. The profile is collectively viewed by at least two optical detectors, which each have a different view than the others and provide an output signal representing its particular view of the profile. The output signals are received by an image processor, which digitizes the signals, provides filtering, and identifies (extracts) the points in each view that represent the profile. The image processor uses a predetermined set of calibration parameters to transform the coordinates of the extracted points to corresponding coordinates in a common reference system that collectively represent the profile of the object.

Methods for evaluating a profile of a blade edge are also provided, including methods for locating the tip of a profile, comparing the profile to a tolerance band, and finding a width (thickness) of the profile. These methods provide quick and accurate evaluations and are not prone to errors during data manipulation. Nor do they require measurements of other profile portions not of primary concern.

11 Claims, 8 Drawing Sheets

U.S. PATENT DOCUMENTS

| | | | |
|---|---|---|---|
| 4,811,253 | * 3/1989 | Johns | 364/560 |
| 4,827,436 | 5/1989 | Sabersky et al. | 364/559 |
| 4,858,156 | 8/1989 | Martin | 364/560 |
| 4,875,777 | 10/1989 | Harding | 356/376 |
| 4,908,782 | * 3/1990 | Pekarek et al. | 364/560 |
| 5,028,799 | 7/1991 | Chen et al. | 250/561 |
| 5,090,811 | 2/1992 | Donaldson | 356/376 |
| 5,325,443 | 6/1994 | Beatty et al. | 382/8 |
| 5,440,392 | * 8/1995 | Pettersen et al. | 356/375 |
| 5,444,536 | 8/1995 | Satzger et al. | 356/376 |
| 5,500,737 | 3/1996 | Donaldson et al. | 356/376 |
| 5,517,310 | * 5/1996 | Paquette | 356/375 |
| 5,552,822 | * 9/1996 | Nallakrisshnan | 348/79 |
| 5,619,587 | 4/1997 | Willoughby, Jr. et al. | 382/141 |

OTHER PUBLICATIONS

IEEE Journal of Robotics and Automation, vol. RA–3, No. 4, Aug. 1987, "A Versatile Camera Calibration Technique for High–Accuracy 3D Machine Vision Metrology Using Off–the–Shelf TV Cameras and Lenses", by Roger Y. Tsai, pp. 323–344.

"Optical Detection of Surface Flaws on Extruded Cables" by LeRoy G. Puffer, Oct. 1984, Presented to the SPIE's Cambridge Symposium on Optical and Electro–Optical Engineering in Cambridge, MA, 6 pp.

* cited by examiner

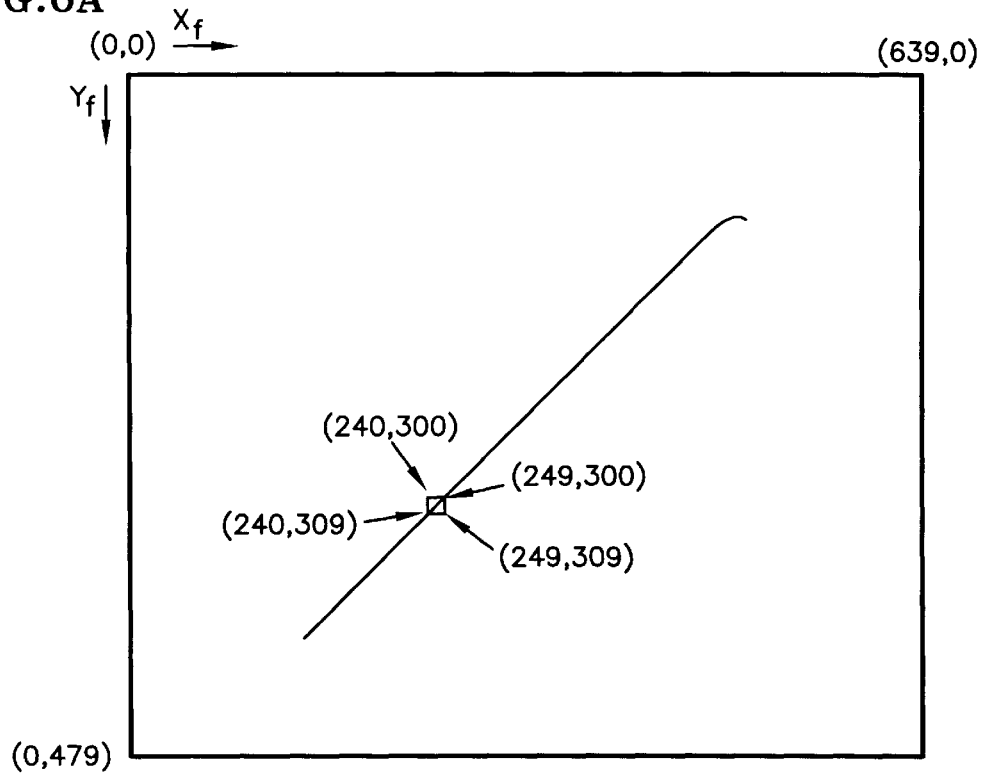
FIG.6A
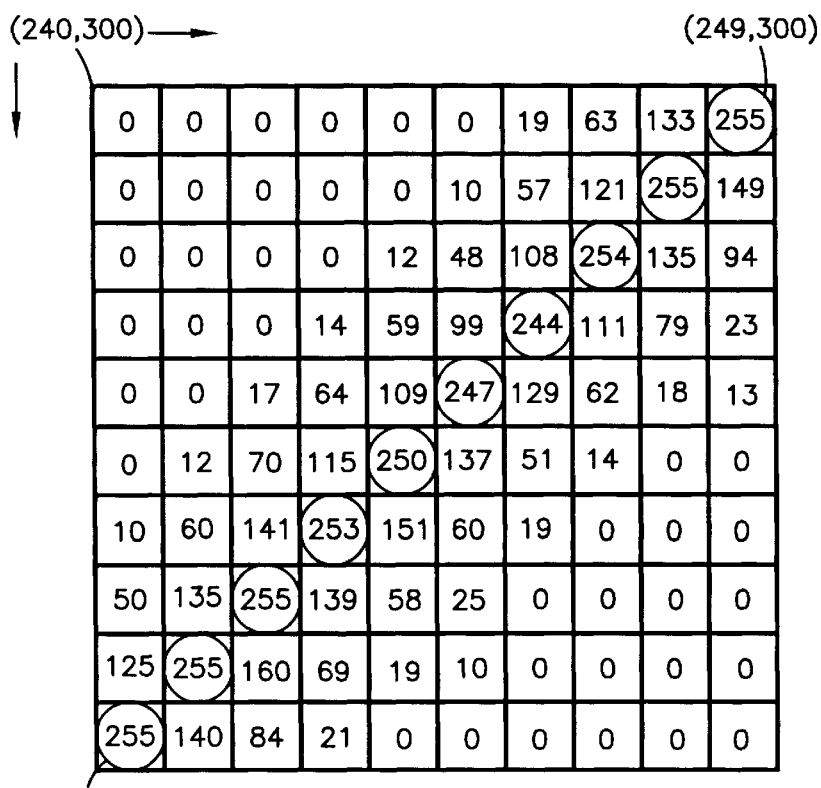
FIG.6B
| $X_f$ | $Y_f$ |
|---|---|
| 240 | 309 |
| 241 | 308 |
| 242 | 307 |
| 243 | 306 |
| 244 | 305 |
| 245 | 304 |
| 246 | 303 |
| 247 | 302 |
| 248 | 301 |
| 249 | 300 |
FIG.6C FIG.9
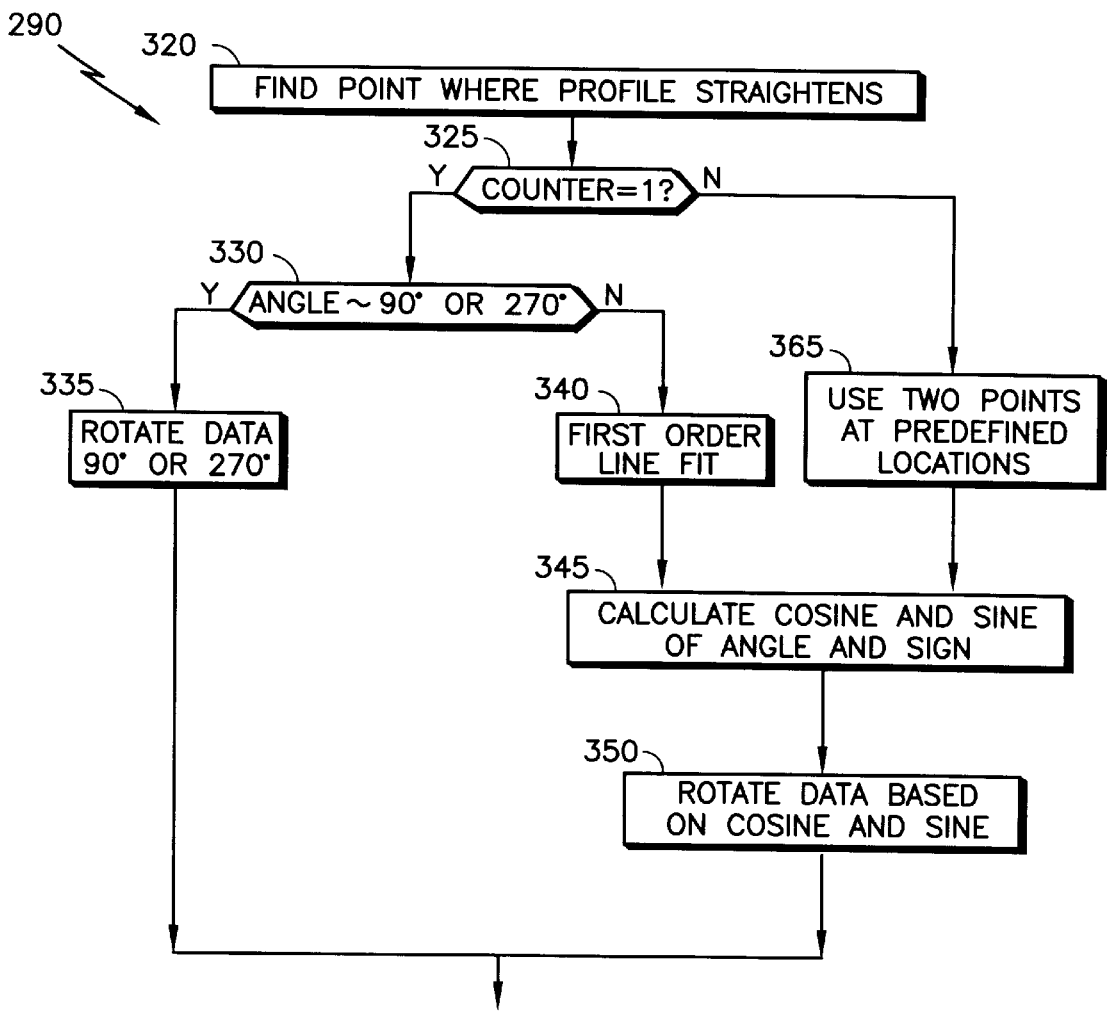
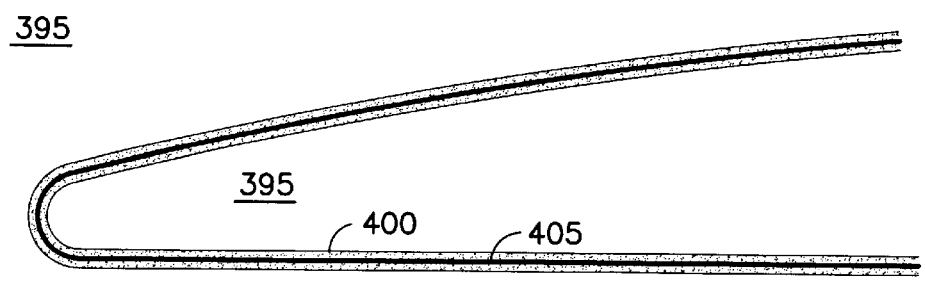
FIG.10

OPTICAL PROFILE SENSOR

This is a division of copending application Ser. No. 08/801,336 filed on Feb. 19, 1997.

DESCRIPTION

1. Technical Field

This invention relates to optical sensors, more particularly to optical sensors for determining a profile of an object.

1. Background Art

Precision components must often meet stringent requirements for dimensions, profile, and surface finish. For example, an edge on an aircraft engine blade is processed in accordance with strict standards for all of the above. Thus, an inspection system capable of making such measurements is needed.

The blade or airfoil is sometimes inspected by templates or gauges which are placed on the feature of interest and visually checked for fit. Another inspection process, involves pressing a wax stick on the blade edge to thereby get an impression of the blade edge. The wax impression is removed from the blade, backlit, magnified, and projected on a screen for a dimensional check with a plastic template. However, neither of these methods are accurate enough to meet the stringent inspection requirements required for these critical components.

Alternatively, blades are often inspected by a coordinate measuring machine (CMM) equipped with a touch probe. However, measurement of a blade edge by a touch probe is a difficult task. Furthermore, a CMM machine generally takes hours to measure a single blade edge. Collectively, these short comings suggest that, mechanical inspection devices are inherently limited in their ability to accurately and quickly measure components having complex profiles. Therefore, an optical rather that mechanical, sensor is sought.

An optical sensor for measuring the profile of a blade edge has been suggested in a prior art paper (see Chiarella, M., and Pietrzak, K. A., "An Accurate Calibration Technique for 3-D Laser Stripe Sensors", *Proceedings of the SPIE Conference on Optics, Illumination, and Image Sensing for Machine Vision IV*, SPIE Vol. 1194, Nov. 8–10, 1989, pp 176–185.) This sensor uses a light source to project a plane of light toward the surface of a blade, thereby illuminating the surface, in the form of a stripe. The profile of the illuminated surface is then viewed by a camera. However, such a sensor has limited capability because it can only illuminate and view a small portion of the blade edge at a time. While it can be moved to view a different portion of the blade edge, the views cannot be combined because each view represents a different perspective, and there is no common reference for combining them. Therefore it does not measure the overall profile of the blade edge.

Various other optical sensors exist, although, none are well suited to determining the profile of the edge of a blade. For example, stereovision combines images from multiple cameras, but in order to do so, it requires that a particular distinguishable feature be within the view of all the cameras at the same time. This is not practical for blade edges because there are no such features on the edge of a blade. Optical triangulation schemes can be used to illuminate, view and determine the distance to a point on a surface. A surface contour may be determined by scanning the surface, i.e. successively illuminating, viewing and determining the distance to different points on the surface. However, this is difficult at best for a surface with a complex profile such as that of a blade edge. In addition, triangulation requires that the positioning of all the optical components be precisely known. Furthermore, triangulation typically can not compensate for such optical imperfections as lens distortion. A special effects generator can be used to combine images from cameras viewing different portions of an object, but such a technique has limited accuracy unless all of the cameras are precisely oriented relative to the object and each other. Because of this limitation, such technique is generally not suitable for use in determining the profile of a blade edge.

In a scheme somewhat related to stereovision, a sensor projects reference features onto the surface to be profiled, to provide references for combining views from multiple cameras. One such sensor, for example, uses two light (ine) sources and two cameras to measure the transverse profile of the head of a rail of a railroad track (U.S. Pat. No. 4,531,837). The head has a generally flat top. The light sources are projected at the head, from angles above, to illuminate the profile. A discontinuity in the illumination, i.e. a dark spot, is provided on the flat top of the head. Each camera views the dark spot and one side of the profile. The dark spot provides a common reference point used in combining the views. However, such a scheme can only be used on surfaces having particular geometries, e.g., a flat top. This scheme, however, is not practical for a complex profiles such as that of blade edge. First, the blade edge does not have a large flat surface suitable for projecting such a spot. Second, such a spot would obscure critical aspects of the edge profile.

Thus, an improved optical inspection device for quickly and accurately measuring blade edges, and other components, with critical dimensions and/or complex profiles is sought. As a minimum, such a device should be capable of determining the entire profile of a blade edge, i.e. be able to view both sides of the blade edge and accurately combine the two views together to provide a complete profile.

A method for quickly and accurately evaluating the profile is also sought. A traditional method requires that a cross section of the entire blade, not just the edge, be determined. Then, a best fit of the blade cross section is performed, and a normal deviation at every point on the edge is computed. This method has several disadvantages: it requires measurements of blade portions which are not of primary concern, it is slow, and it is prone to encounter errors during data manipulation. Thus, a better method is sought.

DISCLOSURE OF THE INVENTION

To overcome the problems described above, the apparatus of the present invention has at least one light source which projects a sheet of light at the surface of an object, thereby illuminating a profile, which is collectively viewed by at least two optical detectors, where each detector produces a signal representative of its view. An image processor receives the detector signals and uses calibration parameters to produce signals which collectively represent the profile. Such apparatus, in effect, "combines" views from multiple optical detectors so that a complex profile may be quickly and accurately determined. The calibration parameters are preferably predetermined. The calibration parameters may represent parameters derived by having the detectors view a known target and having at least one of the detectors view an intersection of the sheet of light and a target surface. The projected light sheet may be generally planar in a target region and generally perpendicular, to the surface of the object. The detectors may be angled nearly parallel to the surface of the object. The detectors may comprise video cameras. The apparatus may be used to obtain the profile of any suitable object including but not limited to edges of objects and the leading and trailing edges of airfoils. The apparatus may further comprise means for comparing a profile to a nominal profile and or means for making measurements on the profile.

In a second aspect of the invention, a method for evaluating a profile of a blade edge comprises the steps of: rotating the profile to orient it such that one of its two sides is substantially parallel to a coordinate axis, and locating the tip by determining which point has an extrememost coordinate value in one direction along the coordinate axis. This method quickly and accurately determines the location of the tip of the profile, and may serve as the basis for further evaluation of the profile. It is not prone to errors during data manipulation, nor does it require measurements of other profile portions not of primary concern. The method may involve finding and determining a line of a relatively flat section on the side of the profile, and rotating the profile to orient it such that the line is substantially parallel to the coordinate axis.

In a third aspect of the invention, a method for evaluating a profile of a blade edge comprises the steps of: aligning the profile with a profile tolerance band in a coordinate system, providing a plurality of memory locations for storing values, where each of the memory elements is associated with a point in the coordinate system, setting the value of the memory locations such that those associated with points in the tolerance band have a first value and those associated with points in the tolerance band have a second value, and determining whether the points of the profile are within the tolerance band by evaluating the value of the memory locations associated with points of the profile. This method provides quick and accurate comparison of the profile to a profile tolerance band. As with the method of the second aspect, this method is not prone to errors during data manipulation, nor does it require measurements of other profile portions not of primary concern. The memory locations may be those of a video display system and the values may represent a color at a location on the display of the display system.

In a fourth aspect of the invention, a method for determining the width of a profile of a blade edge comprises the steps of: determining the tip of the profile, determining a median line and a point on the median line at a distance from the tip, determining a line that is perpendicular to the median line and includes the determined point, determining two groups of points proximate to where said perpendicular line intersects with the two sides of the profile, determining two intersected lines to represent the two groups of points, and determining the width of the profile as the length of the perpendicular line lying between the two intersected lines. This method provides quick and accurate determination of the width (thickness) of the profile. As with the methods of the second and third aspects, this method is not prone to errors during data manipulation, nor does it require measurements of other profile portions not of primary concern.

BRIEF DESCRIPTION OF THE DRAWINGS

FIG. 6A is a graphical representation, of an image in a two dimensional, $x_p$, $y_p$, coordinate plane, with a box around a portion of the image;

FIG. 6B is a table of element magnitudes in a portion of a pixel array representing the boxed portion of the image in FIG. 6A, with circles around the magnitudes lying on the centerline;

FIG. 6C is a table of coordinate pairs in a portion of a profile array corresponding to the portion of the pixel array in FIG. 6B;

FIG. 9 is a simplified flowchart of an exemplary embodiment of a profile rotation process;

FIG. 10 is an illustration of a display provided by the image processor, showing representations of the edge profile overlaid with the profile tolerance band;

BEST MODE EMBODIMENT FOR CARRYING OUT THE INVENTION

Figure 1:
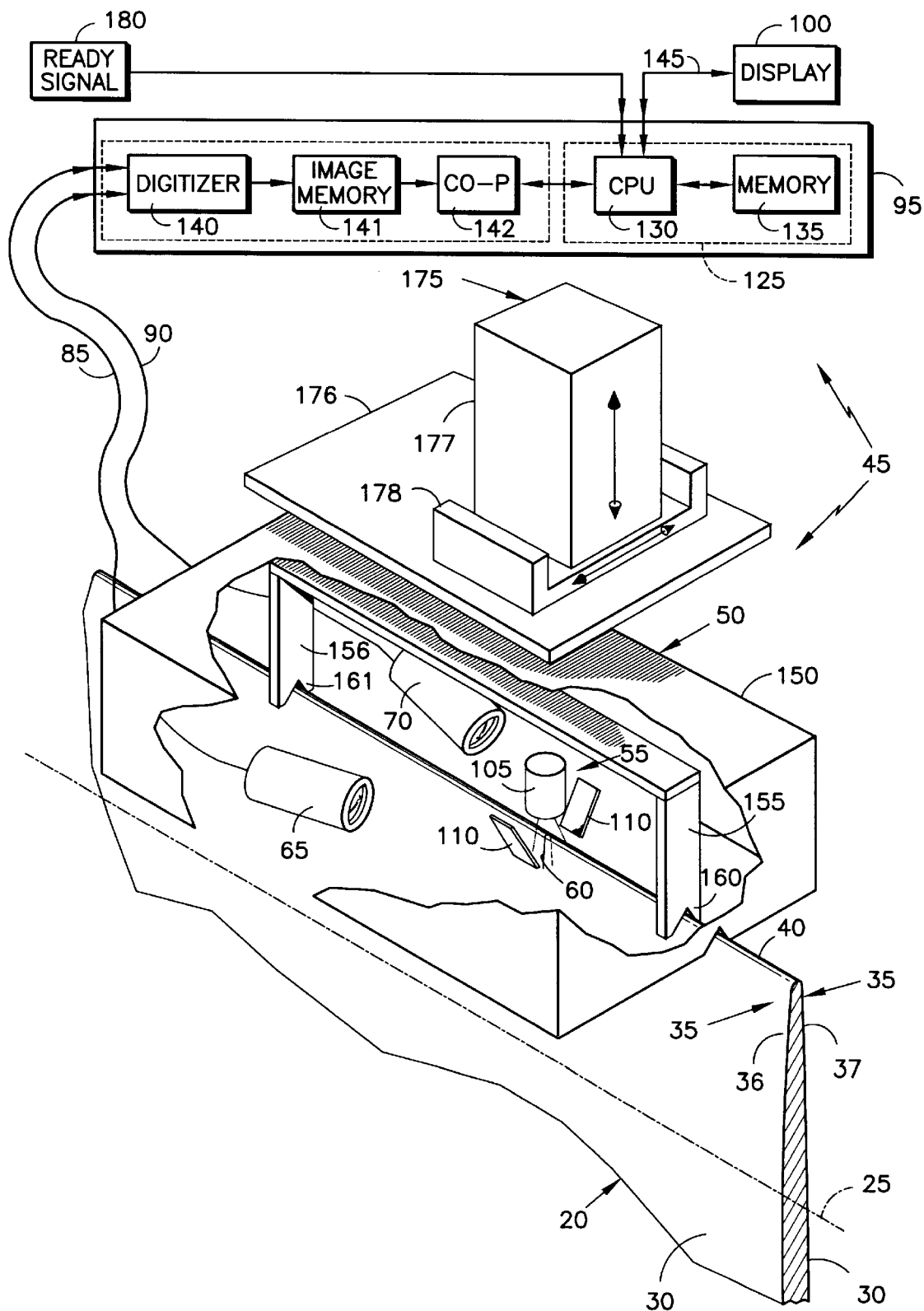
FIG. 1 is a combination of a perspective view of an edged portion of airfoil and a simplified exploded perspective view of an optical sensor with its cover in phantom and an optional coupling, in combination with a simplified block diagram of an electronic image processing system for receiving and evaluating signals received from the optical sensor, according to the present invention.

The present invention is disclosed with respect to a best mode embodiment for use with a gas turbine engine airfoil, as illustrated, in FIG. 1.

Referring now to FIG. 1, an airfoil 20, has a longitudinal axis 25, and an outer surface 30 with a longitudinal (elongated) edge 35. The edge 35, has two sides 36, 37 and an outermost portion 40, which may be sharp or rounded. The edge 35 may have a twisting shape and a different profile at each location along its length.

An apparatus 45 for obtaining and measuring the profile at any location along the edge 35 comprises a sensor 50 having a light source 55 which projects a sheet of light that is intersected by the edge, whereby a stripe 60 of points on the edge are illuminated. The light source must project the sheet from multiple angles, so that the resulting stripe is preferably substantially continuous across the outermost portion 40 and sides of the edge 35. The illuminated stripe 60 represents a profile of the edge 35 which is collectively viewed by a pair of video cameras 65, 70, positioned on opposite sides of the blade. Each video camera 70 views a respective side 75, 80 (see FIG. 2) of the illuminated stripe 60, and provides an output signal, over video lines 85, 90, representing its particular view of the profile. The video camera output signals are received by an image processor 95, which digitizes the camera output signals, provides filtering, and identifies (extracts) the points in each view that represent the profile. The image processor 95 uses a predetermined set of calibration parameters to transform the coordinates of the extracted points to corresponding coordinates in a common reference system. This step in effect "combines" the two sides of the profile, such that, collectively, these coordinates represent the profile of the edge. The image processor 95 may further process the profile in order to display the profile and a corresponding profile tolerance band (see FIG. 10) on a video display system 100, whereupon any out of tolerance points on the profile are identified. The processor 95 may also determine the width (see FIG. 11) of the profile, and display the result on the display system 100.

In the best mode embodiment, the light source 55 comprises a single laser diode (laser) 105 and two mirrors 1110. The laser 105 includes a cylindrical lens that spreads the light into a general sheet which is projected toward, preferably at substantial right angles to, the blade edge. Mirrors 110 reflect (project) light at the sides 36, 37, to illuminate, i.e. stripe, the edge whereupon, due to the shape of the blade, the light is not directly incident. The mirrors are preferably aligned with the laser so that the projected sheet is substantially planar, within the target area, i.e. the cross sectional area within the stripe 60.

The laser's lens and its distance to the blade edge should be chosen so that the projected light sheet is generally focused on the blade edge. Consideration should be given to both focal length (focus distance) and laser depth of field. However, some out of focus (misfocus) can be tolerated because of the positioning of the cameras, described hereinbelow.

The laser 105 may be of maximum practical power to facilitate better imaging of shiny objects and use of a smaller camera aperture, described hereinbelow. In this embodiment, the magnitude of the laser power is about 20 milliwatts. The laser 105 light is preferably in the visible range, e.g., 680 nanometers, to alert an operator of its presence, thereby reducing the possibility of injury. A circuit with a softstart is recommended for powering the laser.

The video cameras 65, 70 are preferably black and white solid state video cameras, e.g., PANASONIC Model GP-MS112. The cameras 65, 70 each have a lens which projects the image of the profile onto a sensor in the camera, and further include an aperture to limit the amount of light entering the sensor and improve the depth of focus. To reduce transmission of ambient light, the cameras may include a narrow band filter which only passes light having a wavelength close to that of the laser light (e.g., about 680 nanometers).

The cameras are positioned to view the profile at an oblique angle relative to the light sheet, preferably so that its optical axes are nearly perpendicular (here about at least 80 degrees) to the light sheet. This provides a more accurate view of the profile and helps the system accommodate some misfocus in the illuminated profile. The nearly perpendicular positioning also keeps the required imaging depth of field (DOF) small, thus permitting a large camera aperture, and thereby resulting in increased light sensitivity. Thus, the required laser power is less, thereby reducing the cost and increasing the reliability of the laser.

Figure 2:
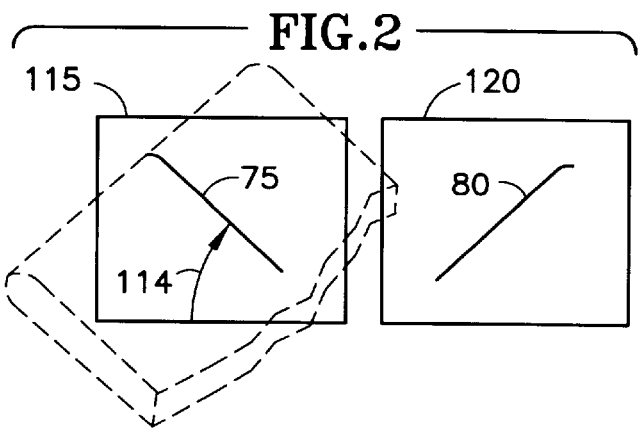
FIG. 2 is a stylized representation of two views of the edge of the airfoil, as observed by the optical sensor in FIG. 1.

Referring now to FIG. 2, the video cameras 65, 70 (FIG. 1) are preferably oriented in such a way that each side 75, 80 of the stripe 60 (FIG. 1) is angled 114 at approximately 45 degrees within the field-of-view 115, 120, i.e. diagonally across the field of view 115, 120. This facilitates maximum image magnification hence, maximum resolution and accuracy. It also simplifies the processing steps, described hereinbelow, performed by the image processor 95. In the present embodiment, about 0.75 inches of the blade edge are imaged by each camera, where about 0.60 inches of the 0.75 inches are of particular interest.

It should be recognized that although the light source and cameras may be precisely positioned to provide optimum optical performance, their positions need not be precisely known, because the present invention uses calibration and calibration parameters, as described hereinbelow.

Referring again to FIG. 1, each of the cameras 65, 70 produces a continuous output signal, in an RS-170 analog video format, representative of the two dimensional image viewed by the camera. The camera output signals are conducted through the pair of video cables 85, 90, to the image processor 95. The image processor preferably comprises a general purpose industrial computer 125, having a CPU 130 and a memory 135, and further comprises a MATROX Image-LC image processing board having a digitizer 140, an image memory 141, and a coprocessing module 142. The camera output signal is presented to the digitizer 140, which produces a corresponding digital signal representation of the video signal. The digital signal is organized as an array of elements, described hereinbelow, and is stored in the image memory 141. The coprocessing module 142 implements basic image processing tasks faster than a typical CPU. The CPU 130 sends task commands to the coprocessing module 142. On completion, the coprocessing module 142 sends data back to the CPU 130. Alternatively where suitable, the CPU 130 could handle all of the image processing tasks. An image processing program is stored in the memory 135. The image processor 95 is connected via a video cable 145 to a video display system 100, for displaying information to the operator.

The light source 55 and cameras 65, 70 are adjustably mounted to a housing 150, by means of mechanical fixturing which is not shown but well known in the art. The housing 150 helps to keep out ambient light that might otherwise hinder viewing of the stripe 60. A U-shaped bracket having legs 155, 156, with bifurcated ends 160, 161, are fixedly mounted to the housing 150. The distance between the brackets 155, 156 may be several inches. The bifurcated ends 160, 161 receive the blade edge to locate the sensor 50 vertically and laterally, with respect to the airfoil 20. The forwardmost bracket leg 155 is preferably positioned immediately in front of the light sheet to assure proper positioning of the sensor and blade in the vicinity of the profile.

Figure 3:
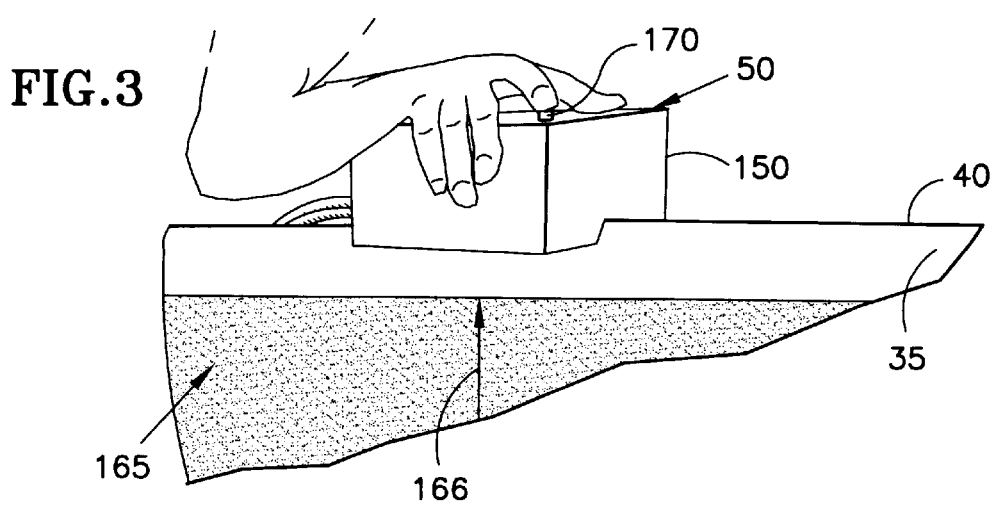
FIG. 3 is a perspective view of an operator manually positioning the optical sensor of FIG. 1 on the edge of the airfoil.

The sensor 50 may be placed on the edge 35 by manual means, as illustrated in FIG. 3. In such case, a template 165 with indicator marks 166 may be used to help locate the sensor 50, and the housing 150 may have one or more push-button electrical switches 170 to enable the operator to initiate signals to the image processor. Alternatively, the sensor may be placed by automated means, such as by a robot, which attaches to the sensor by means of an optional coupling 175. The coupling 175 has a plate 176, which attaches to the housing 150, and compliant members 177, 178 which provide flexibility in the vertical and lateral directions, respectively. Such flexibility is recommended to accommodate misalignments between the sensor and the blade, and because the shapes of the blades vary somewhat from one another, due to normal manufacturing inaccuracies. It also reduces the likelihood that the brackets 155, 156 will bind on the edge 35. If a robot is used, the rearmost bracket leg 156 should be loose around the edge, to prevent binding.

Figure 4:
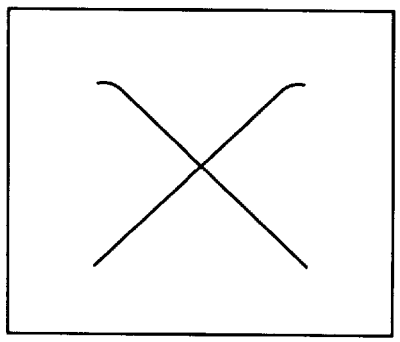
FIG. 4 is an illustration of a display provided by the image processor of FIG. 1, showing representations of the images received from the sensor upon optimal angling of the sensor on the edge of the airfoil.

The brackets 155, 156 do not fix the tilt, or angle, of the sensor 50, relative to the blade 20 edge 35, i.e. the sensor can lean toward one side of the blade or the other. Thus, if an operator is positioning the sensor (FIG. 3), the operator must properly angle the sensor such that each of the cameras has a good view of the blade edge. To assist, the image processor 95 superimposes the image signals from the cameras to produce a resultant image and the resultant image is displayed on the video display system 100, as illustrated in FIG. 4. The sensor is properly angled when the superimposed images have about the same size outermost portion 40 as each other, and the resultant image has the shape of a generally symmetrical X (FIG. 4). The display is continuously updated, making it somewhat "live", to give the operator continuous and contemporaneous feedback. The image processor 95 "waits" for an indication (ready signal 180) that the sensor is satisfactorily positioned. The operator initiates such by depressing either one of two push button electric switches (FIG. 3) provided on the outside of the sensor housing, causing the processor to halt "live" display of the superimposed images and initiate image processing.

If a robot is used, the tilt, i.e. angle positioning step above need only be performed upon initially programming the robot for a location. At that time, the display (FIG. 4) may be used to position the robot at the optimal angle. The robot may then be commanded to store the position. Thereafter, the robot will achieve the optimum angle automatically based upon its programming. When satisfactorily positioned, the robot can automatically initiate the ready signal to the image processor 95.

Figure 5:
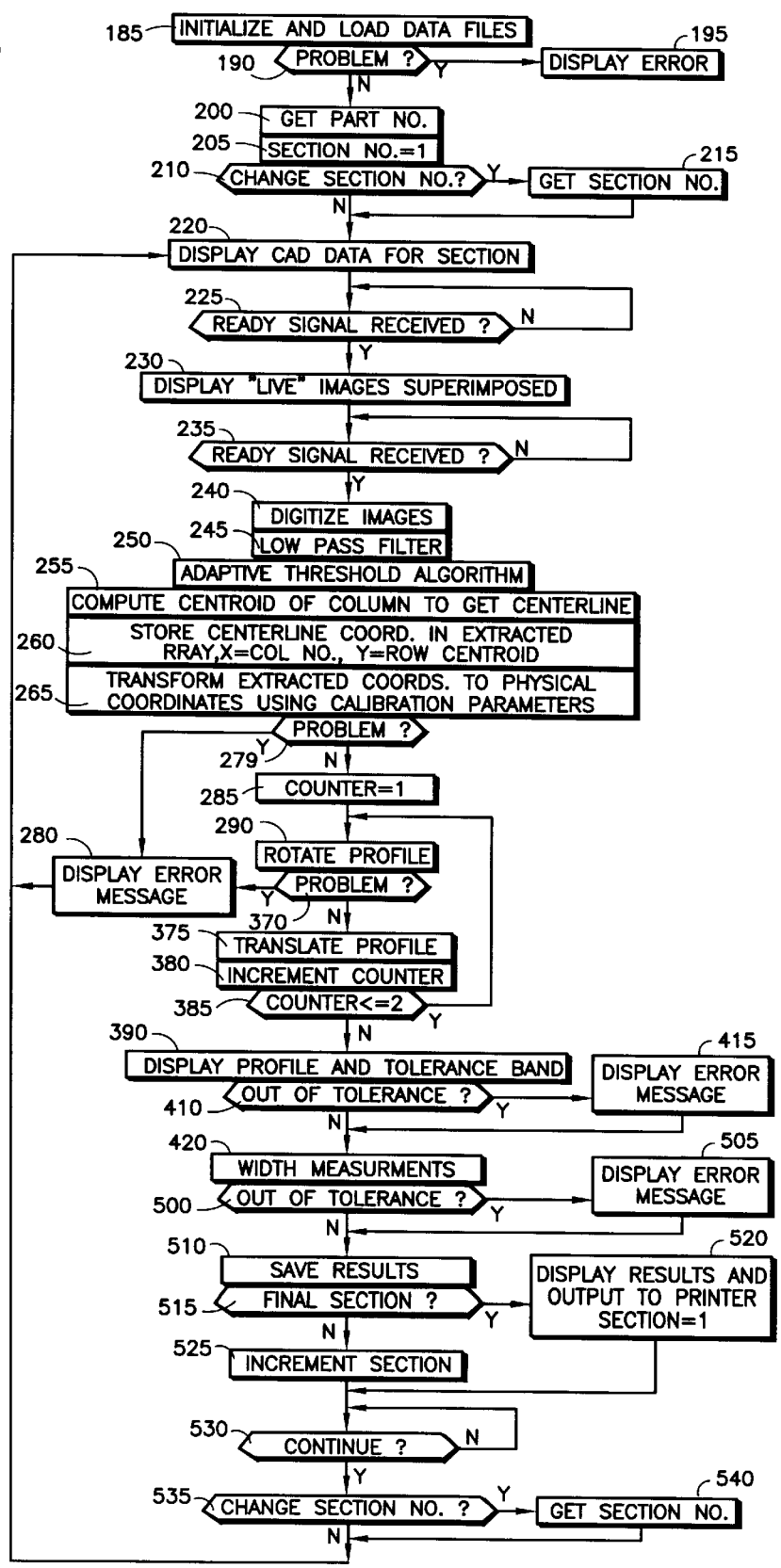
FIG. 5 is a simplified flowchart of an exemplary embodiment of the image processing steps which may be performed by the image processor of FIG. 1.

Referring now to FIG. 5, a flowchart for a preferred image processing program within the image processor 95 begins with a subroutine 185 (which in fact may be several different subroutines) for initializing the system and loading of data files. Such data files may contain calibration parameters, used in practicing the present invention, in addition to the profile and width requirements for the edge. A subroutine 190 determines whether there are any problems with the above steps, and if so, an error message is called for by a subroutine 195. If there are no problems, subroutines 200, 205 query the operator for the part number and set the section number, i.e. the expected profile location equal to one. A subroutine 210 determines whether a change in section number is desired, and if so, the operator is queried for a new section number at a subroutine 215. The program proceeds to a subroutine 220 which displays the edge profile tolerance band for the section number. A subroutine 225 prevents the program from proceeding until receipt of the ready signal 180 (FIG. 1), e.g., depression of a button 170 (FIG. 3) on the housing 150 or signal from the robot. Once the ready signal 180 (FIG. 1) is received, a subroutine 230 provides for the "live" images to be superimposed and displayed (FIG. 4), to assist in optimal tilting, i.e. angling, of the sensor, as described hereinabove.

A subroutine 235 waits for the ready signal 180 (FIG. 1), upon receipt of which, a subroutine 240 initiates digitization of the camera signals to produce corresponding digital signal representations of the two dimensional images. The digital representations are each organized in the form of an array of elements (pixels), one for each coordinate location in each two dimensional image, where each pixel has a magnitude in a range, e.g. 0 to 255, representing the gray level intensity at its associated coordinate location, as illustrated in FIGS. 6A, 6B. Then, a subroutine 245 calls for the digital representations to be low pass filtered, to reduce the effects of surface microstructure noise. Upon reaching subroutine 250, an adaptive thresholding algorithm is applied to the filtered digital representations. This algorithm further reduces the effect of noise, reduces the effects of secondary reflection, and facilitates identification of a group of pixels representing the laser stripe in each digital representation. A macro statement of an exemplary embodiment of the steps involved with the adaptive thresholding algorithm is set forth in Table 1.

Table 1

1. Dilate (gray level dilation) low pass filtered image along each column by an N×1 structuring element. N must be greater than the maximum width of the light stripe. Increasing N improves the filtering of any remaining noise and increases the processing time.

2. Divide dilated image by 2.

3. Subtract dilated image from low pass filtered image. This has the effect of applying a lower threshold where light levels of the light stripe are low and a higher threshold where light levels are high.

4. Binarize the resulting image using a constant threshold. The threshold should be selected to minimize noise pixels, but to retain all of the light stripe.

5. Dilate resulting binary image with a circular structuring element to connect the disconnected pixel regions (certain portions of the light stripe may be missing due to reflectivity problems, resulting in two or more disconnected pixel regions) and ideally attain one region of connected pixels representing the light stripe.

6. Perform connectivity analysis on resulting image. This step generates a labeled image where each resulting connected pixel region's (blob's) pixels are given a value (1–255), and all background pixels are given a value of 0.

7. Compute the area of each resulting blob.

8. Eliminate all resulting blobs below a specific area threshold (set pixel values of these blobs to 0). These are either noise spots or secondary reflections.

9. If there is more than one blob remaining, then check the left and right end points of each blob. If an endpoint of one blob is close to an endpoint of another blob, then the two blobs can be relabeled as one blob (i.e. given the same pixel value). This connects portions of the light stripe which may be separated by a small gap in the light stripe. If there is more than one blob remaining, then one is the light stripe, the others are secondary reflections. Keep the blob with the greatest area. Set pixels of all other blobs to 0. as the light stripe blob. The pixels of the remaining blob represent the light stripe.

10. Relabel the remaining blob to 255 and perform a bit wise logical AND operation with the low passed filtered image.

Each resulting image is then processed in a subroutine 255, to extract the centerline of the stripe, by computing the gray level centroid for each column of pixels. The coordinates of the centroids represent the centerline coordinates. For each image, a subroutine 260 stores the centerline coordinates in an array (extracted array), as illustrated in FIG. 6C. It should be noted that, while FIG. 6C shows the extracted coordinates as whole number values, they may also have a fractional part to provide subpixel resolution.

As mentioned above, positioning the profile images on diagonals within the field of view (FIG. 2), is motivated, in part, by a desire to simplify the image processing. With the image on the diagonal, only one narrow width stripe appears in any column. Thus the image can be processed vertically, i.e. column by column, to define the profile with high resolution and without ambiguity. If the cameras were set up to provide an image on the other diagonal, then optimum resolution would be obtained by horizontal processing rather than vertical processing. By contrast, if the image was horizontal, the tip of the profile, i.e. the portion of the profile corresponding to the outermost portion 40 of the edge 35, would appear almost vertical, i.e. a long stripe in a column. This would preclude the use of vertical processing for the tip. Although horizontal, i.e. row by row, processing could be used for the tip, it could not be used for the rest of the profile, which is horizontal in the image. Consequently, one type of processing could not be used across the entire image.

Figure 7:
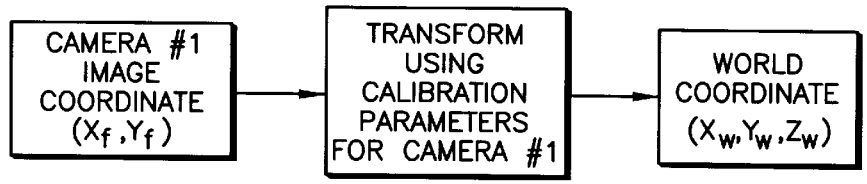
FIG. 7 is a simplified block diagram showing the transform used in the best mode embodiment of the present invention.

A subroutine 265 initiates transformation of the two dimensional coordinates in the extracted arrays to corresponding world, i.e. physical, coordinates, as illustrated by example, in FIG. 7. The transformation uses calibration parameters derived for each camera, by a calibration procedure, described hereinbelow. The calibration parameters are preferably in the form of a mapping from image coordinates to physical coordinates, in a common reference system. This step interrelates the camera views, albeit indirectly, in effect, "combining" the images of the two cameras, i.e. the two sides of the profile, such that, collectively, these coordinates represent the profile of the edge, complete and in proper spatial relation. Thus, unlike sensors which use stereovision, the present invention can "combine" camera images to determine a profile of an object, without relying on a common reference feature in each image. Nor does the present invention rely on scanning and precise knowledge of the positioning of the optical components, as in sensors which use triangulation.

A subroutine 279 determines whether the transformed arrays (profile arrays)have enough data points to do further processing, if not, then another subroutine displays an error message and the program reverts to subroutine 220 to repeat the process. If the data is OK, a step 285 sets counter equal to one.

A subroutine 290 provides for rotation of the edge profile. The motivation for this step and the preferred technique for doing so are as follows. After transformation, the profile arrays collectively provide a set of rectangular coordinate pairs, e.g. xy coordinates, which indicate the actual physical profile of the edge at a particular location along the length of the edge. In order to compare the edge profile to the nominal profile, one is overlaid on top of the other, in a manner which provides the best fit between the edge profile and the nominal profile. This requires that both profiles, each represented by a set of data points in the XY plane, be similarly oriented and positioned.

Figure 8:
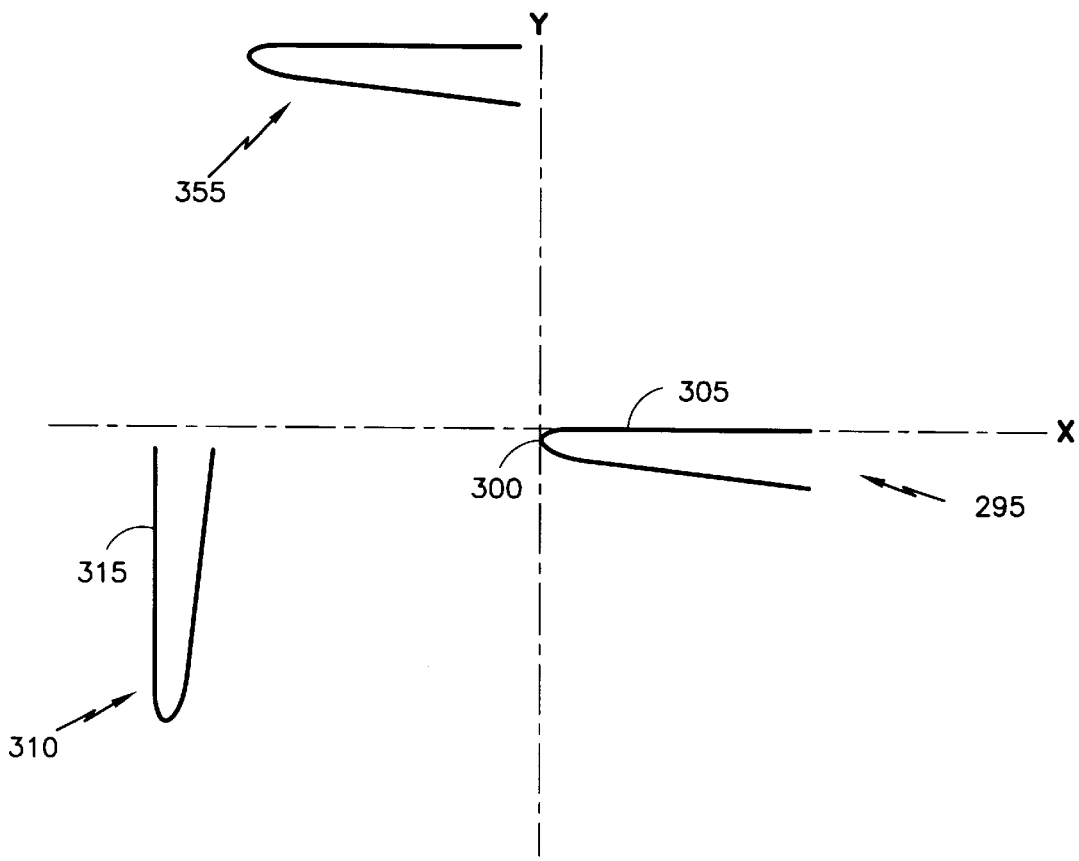
FIG. 8 is a graphical representation, in the xy coordinate plane, of rotation and translation steps which are used to align the coordinates of the edge profile to the coordinates of the nominal profile, prior to comparing the two profiles.

Referring now to FIG. 8, a nominal profile 295, which is generated from CAD files, has been preassigned to specific xy coordinates to provide it with a known orientation and location in the xy coordinate plane, i.e. the tip 300 of the profile is located on the Y axis, and the flattest portion of the flatter side 305 is located on the X axis. It should be obvious that alternative orientations may be used with minor modification to the steps below. A curve 310 illustrates the edge profile which is represented by coordinates pairs in the profile arrays. In order to similarly orient and position the edge profile 310 with the nominal profile, it is preferable to rotate and translate the edge profile coordinates. In doing so, we note that the identity of the array holding the imaging of the flatter side is always known in advance. This is because each location of interest along the length of the edge has a known flatter side, and the sensor 50 is always placed on the edge in the same orientation (camera views away from root). Thus the camera with the flatter side is known, and therefore, the array is also known, because of the known correspondence between the cameras and the arrays. For the edge profile 310, side 315 is the flatter side. It should be understood that although the profiles of the opposite sides of the edge are shown combined, the two arrays representing the opposite sides of the edge profile may alternatively be kept separate while still using the same mathematical steps detailed below. Furthermore, it will be obvious that the steps below may accommodate edge profile data at any orientation and location.

Referring now to FIG. 9, the rotation process begins with a subroutine 320 that uses known methods to find the point where the flatter side of the profile straightens up to form a line. This is so that the angle between the flatter side and the x axis can be determined, so that the profile may be rotated to bring its flatter side parallel to the axis. Step 325 determines whether counter is equal to one, if so, then the first, i.e. the coarser, of two methods is used for the rotation. First, a subroutine 330 makes a determination as to whether the flatter side is about perpendicular to the x axis, i.e. 90 degrees or 270 degrees. To make this determination, the slope of the profile between various points on the flatter side are evaluated. If the magnitude of the slope is large enough, then the flatter side is assumed to be perpendicular to the x axis in which case, a subroutine 335 rotates the profile based upon the determined angle. This technique is employed because alternative numerical analysis techniques do not work well when the angle is nearly perpendicular because the slope is very large., e.g., nearly infinite. In situations where the flatter side is not perpendicular to the x axis, a subroutine 340 performs a first order line fit to the flatter portion of the flatter side 315 of the profile 310 (FIG. 8). Then, a subroutine 345 determines the sine and cosine of the angle and the appropriate signs representing the quadrant. Rotation is performed by a subroutine 350 which uses standard rotational formulas. Referring again to FIG. 8, an edge profile 355, having flatter side 360, illustrates the orientation and location of the edge profile after the first rotation. Referring again to FIG. 9, if subroutine 325 determined that counter is not equal to one then a second method for rotation is used. The second method provides a finer alignment, but it requires that the rough alignment and a translation already be performed. The second method requires that the exact location of the profile be known because it relies on identification of two known points on a flat spot at a predefined distance from the tip of the profile. Using these two points, subroutine 365 determines the equation of a flat line connecting them. Subroutine 345 determines the sine and cosine of the angle between the line and the x axis, as well as the sign indicating the quadrant. Subroutine 350 rotates the profile to make the flatter side closer to parallel with the x axis .

Referring again to FIG. 5, after rotation, a subroutine 370 determines whether there were any problems with the rotation, if so, subroutine 280 provides an error message and the program reverts to subroutine 220.

If there are no problems, a subroutine 375 executes translation of the edge profile 355 (FIG. 8). Referring again to FIG. 8, this involves translation in the x and y direction. It is hoped that after translation the tip of the blade edge will lie on the y axis, i.e. x=0, and that the flat side of the blade will lie on x axis, i.e. y=0. The first step is to find the minimum x coordinate point in the profile array, and subtract its magnitude from all the x coordinates in the array, to provide translation in the x direction. Because the equation for the flat portion of the flat side image is known, translation in the y direction is achieved by adjusting all the y coordinates for the profile according to the y offset of that line. Alternatively, the y value at a known x coordinate location of flat points can be used to determine the appropriate y translation. After the first translation, the edge profile approximately overlays the nominal profile 295.

Referring again to FIG. 5, a step 380 increments counter from one to two. Step 385 determines whether the counter is less than or equal to two, if so, execution reverts to step 290 which performs the rotation of the edge profile using the second method described above. Subroutine 375 will then execute the second translation after which the edge profile is overlaid with the nominal profile in a best fit manner. The step 380 increments counter from two to three and the program passes through the decision step 385.

A subroutine 390 displays the edge profile overlaid with the profile tolerance band as follows. Because both sets of data are discrete points rather than continuous lines and have lower resolution than that of the display, cubic spline interpolation is preferably used to interpolate between points in both sets of data. Referring now to FIG. 10, prior to display of the profile and tolerance band, the display background 395 is a color such as black. Then, the tolerance band 400 is displayed, in a color such as blue. The points of the edge profile 405 are then displayed one at a time. Before displaying each point, the color at the intended location is interrogated, i.e. the display system has the color of each display (screen) location stored in its internal memory, the computer sends a command to the display system requesting the color of the intended location, and the computer examines the response from the display system. If it is the color of the tolerance band, then the profile point is within tolerance and displayed in a color such as white. If the intended location is the color of the background, then the profile point is out of the tolerance band and it may be displayed in a color other than white, such as red to indicate an out of tolerance condition.

As an alternative, the comparison of the profile and tolerance band may be performed entirely within the computer. For example, a plurality of memory locations may be used, where each memory location is associated with a particular point in the coordinate system. The value stored in each of the memory locations is initialized (set to an initial value), and the value stored in each memory location associated with a point within the tolerance band is updated (set to an updated or revised value). The profile may then be dispositioned by evaluating the value in each memory location associated with a point of the profile. If its value is the updated value, the profile point is within tolerance; if its value is the initial value, the profile is out of tolerance. The value in each of these memory locations may be further revised to indicate the presence of the profile and/or reflect the evaluation (disposition). A comparable result may also be obtained by using a pair of such sets of memory locations, one for the tolerance band, another for the profile. The evaluation could be achieved by performing a selected logical operation on the pairs of memory locations associated with the same point in the coordinate system.

There is some redundancy in the profiles from the two cameras, typically a small region at the tip of the profile. However, when displayed on the screen, the redundant region should not indicate any substantial discontinuity between the two profiles, i.e. they should substantially overlap, else the sensor may need recalibration.

Figure 11A:
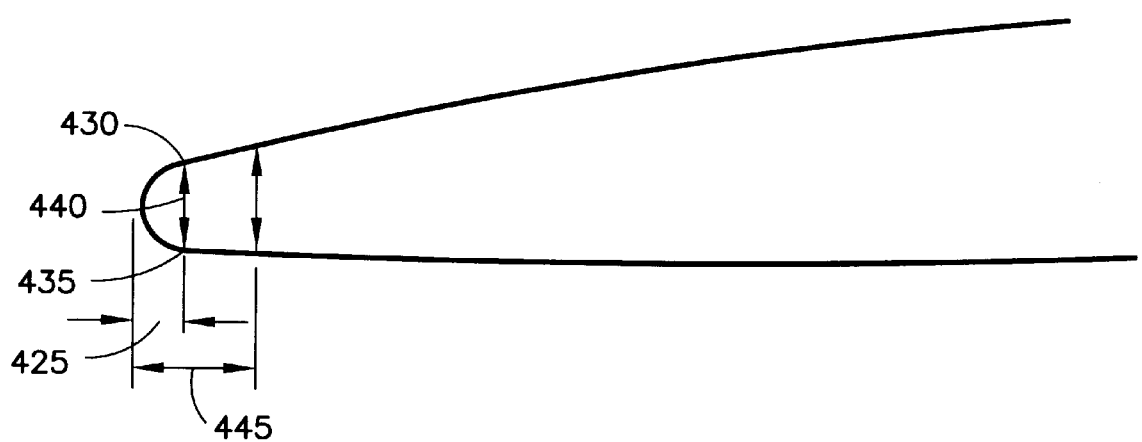
FIG. 11A is a graphical representation of a width measurement performed on the edge profile.

Referring again to FIG. 5, a subroutine 410 determines whether ally edge profile points are out of tolerance, and if so a subroutine 415 displays an error message. Width measurements are then made by a subroutine 420. The width measurements, seek to find the width at particular points from the tip of the blade edge. Two different types of width measurements are used, the first type less complex than the second. Referring now to FIG. 11A, the first type finds the width at a predefined x location 425, without interpolation. On each side of the blade a point 430, 435 nearest to, but not beyond, the predefined x location 425, with respect to the tip of the profile, is found. The corresponding y coordinate values of these two points are subtracted to get the width 440. This type of width measurement is performed at two different predefined x locations 425, 445. There may be different predefined locations for each section number.

Figure 11B:
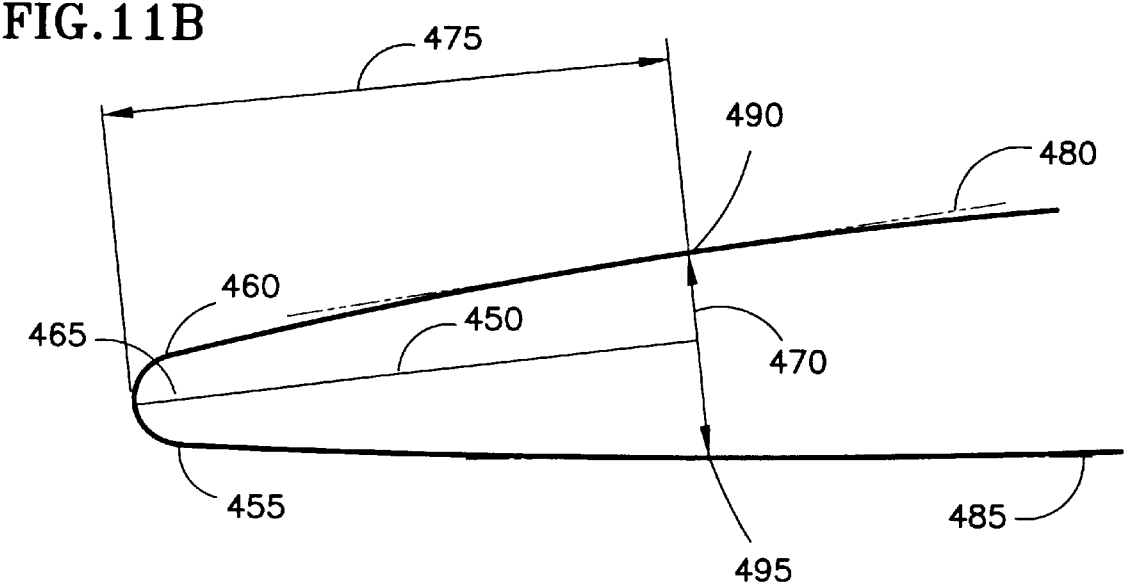
FIG. 11B is a graphical representation of another width measurement performed on the edge profile.

Referring now to FIG. 11B, the second width measurement, begins by determining a median line 450. This is done by selecting a point 455 on the flat side of the profile and finding the point 460 directly opposite it, but not beyond it, on the other side of the profile. The y coordinate values for the two points are averaged to get the y coordinate of the corresponding point 465 on the median line 450. Median points are computed for each data point on the flat side of the profile. The equation of a line 470 perpendicular to the median line 450 at a predetermined distance 475 from the tip of the edge profile is then determined. This line intersects both sides of the blade profile. For each side, an equation of a line 480, 485 passing through points near the intersection of the perpendicular line and the profile is determined. Simultaneous equations are solved to find the coordinates 490, 495 of the intersection of these lines with the perpendicular line. A standard distance formula using x and y coordinate values of the intersection points is used to find the width.

Referring again to FIG. 5, a subroutine 500 determines whether any measured widths are out of tolerance, and if so a subroutine 505 displays an error message. The results are saved, via a subroutine 510, to non volatile mass storage, e.g., magnetic media, hard disk. A step 515 determines whether the section number is equal to the final section, if so results are displayed and printed, and section number is set equal to one, by a subroutine 520. If not, section number is incremented by a step 525. A subroutine 530 waits for an indication to "continue". Upon such, a subroutine 535 determines whether a change to section number is desired, and if so, the operator is queried for a new section number at a subroutine 540. The program reverts to subroutine 220 to determine the profile of the new section number.

As indicated hereinabove, the present invention uses calibration parameters to transform the viewed profile portions to a common reference system. The calibration parameters are preferably in the form of a mapping for each camera, from 2D image coordinates to 3D world coordinates. The mappings preferably use a common 3D world reference system. A calibration process is used to gather calibration data to be used in the mappings. The mapping can be viewed as derived from a system of 3 equations and 3 unknowns, as explained below. The best mode embodiment uses a two part calibration process: a camera calibration and a light plane calibration.

Figure 12B:
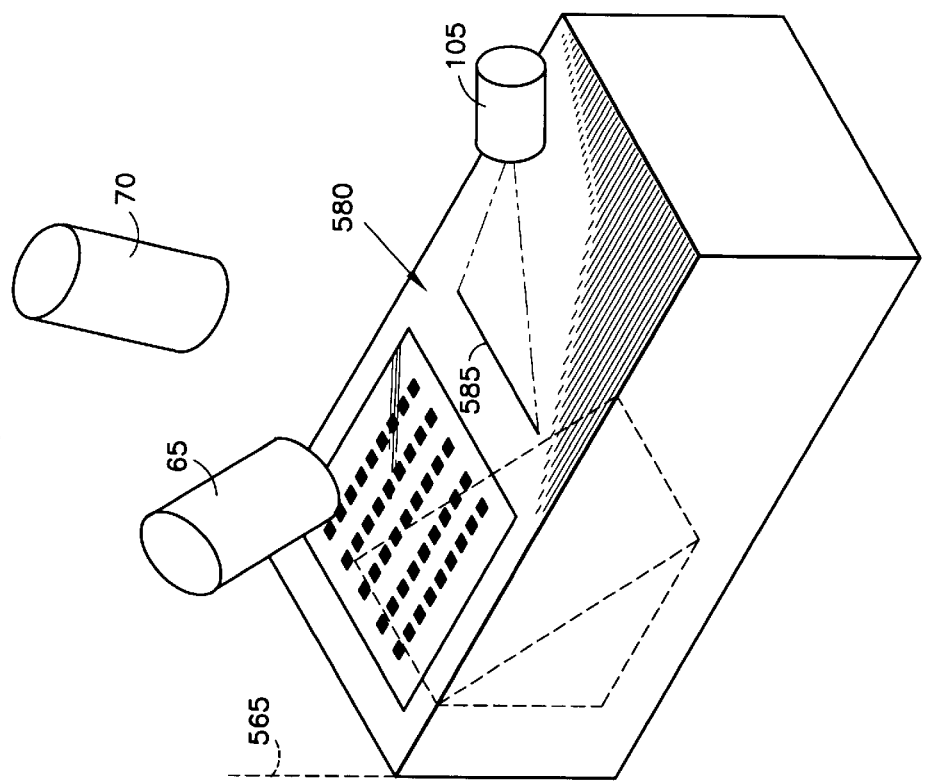
FIG. 12B is a perspective illustration of a configuration for light plane calibration.
Figure 12A:
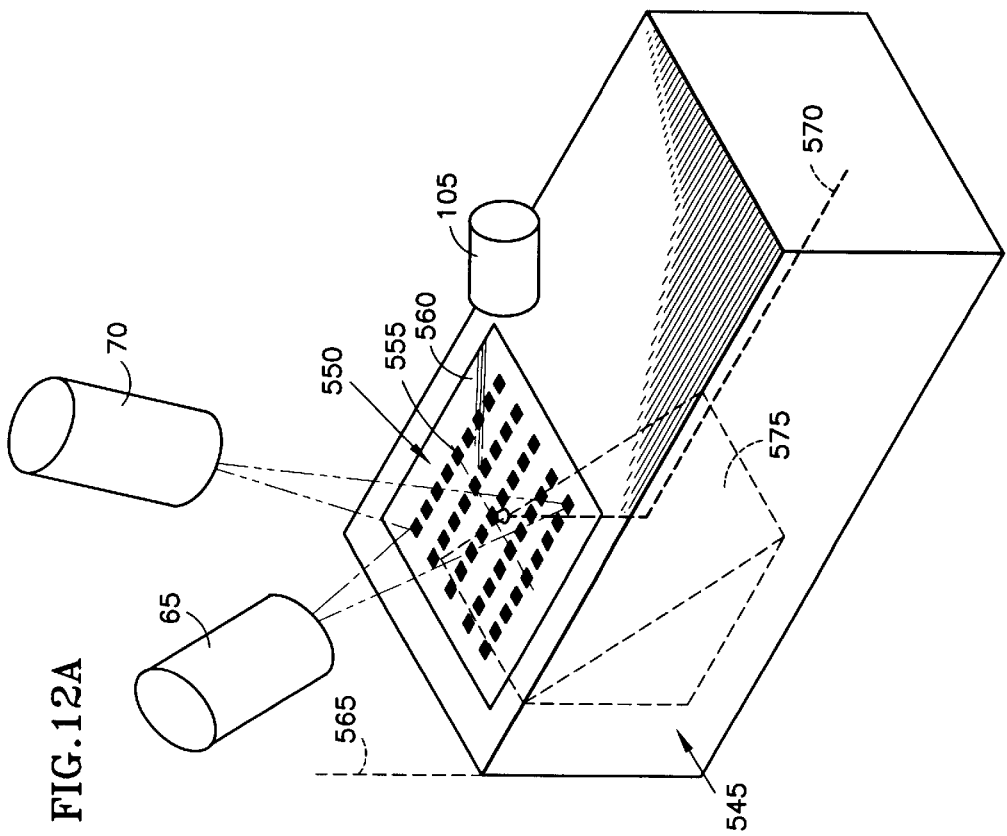
FIG. 12A is a perspective illustration of a configuration for camera calibration.

Referring now to FIG. 12A, a camera calibration target 550 is mounted upon a translation stage 545. The calibration target 550 comprises a grid of black squares 555 (shown as 5×9 for simplicity, but actually 11×11 in practice) photoplotted on a glass plate 560 and mounted to a rectangular shaped block. The location of each square is known precisely within a coordinate system related to some datum on the calibration target 550. The coordinate system may be defined by a corner of the calibration block (z-axis 565 perpendicular to the grid plane). The grid is backlit by a fiber optic light guide 570 and mirror 575. The direction of translation of the translation stage 545 is perpendicular to the glass plate (along the z-axis 565). Other configurations are possible, including but not limited to other targets, that may use point light sources or translucent shapes backlit by a light source.

The sensor 50 (FIG. 1) is positioned over the translation stage 545 such that the cameras 65, 70 and laser 105 are situated about as shown, with the cameras 65, 70 focused on the center of the grid and the laser turned "off". The translation stage 545 is used to translate the target 550 perpendicular to the glass plate (up and down with respect to the cameras), to about ten precisely known positions along the z-axis 565. At each z axis position, an image from each camera is digitized and processed to find the camera's image coordinates $(x_f, y_f)$ for each corner of each visible (preferably 50) square. Because the location of each corner is precisely known, e.g., in 3D world coordinates $(x_w, y_w, z_w)$, a pair of associated coordinates (image/world coordinate pair), $\{(x_f, y_f), (x_w, y_w, z_w)\}$, is obtained for each corner at each z axis position.

Typically, a total of about 2000 image/world coordinate pairs, $\{(x_f, y_f), (x_w, y_w, z_w)\}$, are obtained for each camera, however, the calibration process here may be used with as few as 60 pairs.

While several techniques for processing the camera calibration data are known, the preferred technique is one suggested by Tsai (see Tsai, R. Y. "A Versatile Camera Calibration Technique for High-Accuracy 3D Machine Vision Metrology Using Off-the Shelf TV Cameras and Lenses", *IEEE Journal of Robotics and Automation*, Vol. RA-3, No. 4, August 1987), because it uses a radial alignment constraint to reduce the dimensionality of the unknown parameter space (making it more robust), is simple to compute, and calibrates for radial lens distortion. Given the above determined set of image/world coordinate pairs, $\{(x_f, y_f), (x_w, y_w, z_w)\}$, this technique solves for the following parameters:

f normal distance from the center of the lens to the image plane $s_x$: scaling factor of the camera k: radial lens distortion coefficient R: 3×3 rotation matrix $$R = \begin{bmatrix} R_{11} & R_{12} & R_{13} \\ R_{21} & R_{22} & R_{23} \\ R_{31} & R_{32} & R_{33} \end{bmatrix}$$

$T=(T_x, T_y, T_z)$: ×3 translation vector where R and T define the transformation from the world coordinate system to the camera's 3D coordinate system.

A macro statement of an exemplary embodiment of the steps involved with the preferred camera calibration process is set forth in Table 2.

Table 2

1. Obtain $N_{cx}$, $N_{fx}$, $d_x$, $d_y$, $C_x$, $C_y$, using information of camera and frame memory supplied by manufacturer where $N_{cx}$=number of camera sensor elements in the X (scan line) direction $N_{fx}$=number of pixels in a line as sampled by the digitizer $d_x$=center to center distance between adjacent camera sensor elements in the X (scan line) direction times $(N_{cx}/N_{fx})$ $d_y$=center to center distance between adjacent camera sensor elements in the Y direction $(C_x, C_y)$=the center pixel of image memory 2. Obtain the set of image/world/coordinate pairs as described above 3. For each image/world coordinate pair compute:

$X_d = d_x(x_f - C_x)$
   $Y_d = d_y(y_f - C_y)$

4. Compute $R_{11}/T_y$, $R_{12}/T_y$, $R_{13}/T_y$, $T_x/T_y$, $R_{21}/T_y$, $R_{22}/T_y$, $R_{23}/T_y$ as follows. For each pair $\{(X_d, Y_d), (x_w, y_w, z_w)\}$; set up the following linear equation with $R_{11}/T_y$, $R_{12}/T_y$, $R_{13}/T_y$, $T_x/T_y$, $R_{21}/T_y$, $R_{22}/T_y$, $R_{23}/T_y$ as unknowns:

$$\begin{bmatrix} Y_{d1}x_{w1} & Y_{d1}y_{w1} & Y_{d1}z_{w1} & Y_{d1} & -X_{d1}x_{w1} & -X_{d1}y_{w1} & -X_{d1}z_{w1} \\ & & & \vdots & & & \\ Y_{dN}x_{wN} & Y_{dN}y_{wN} & Y_{dN}z_{wN} & Y_{dN} & -X_{dN}x_{wN} & -X_{dN}y_{wN} & -X_{dN}z_{wN} \end{bmatrix} * \begin{bmatrix} R_{11}/T_y \\ R_{12}/T_y \\ R_{13}/T_y \\ T_x/T_y \\ R_{21}/T_y \\ R_{22}/T_y \\ R_{23}/T_y \end{bmatrix} = \begin{bmatrix} X_{d1} \\ \vdots \\ X_{dN} \end{bmatrix}$$

With N>7, this is solved as an overdetermined system of equations.

5. Compute the following parameters where $a_1=R_{11}/T_y$, $a_2=R_{12}/T_y$, $a_3=R_{13}/T_y$, $a_4=T_x/T_y$, $a_5=R_{21}/T_y$, $a_6=R_{22}/T_y$, and $a_7=R_{23}/T_y$.

$|T_y|=(a_5^2+a_6^2+a_7^2)^{-\frac{1}{2}}$ $s_x=(a_1^2+a_2^2+a_3^2)^{1/2}|T_y|$

6. Compute sign of $|T_y|$

Pick an object point whose computer image coordinate $(x_f, x_f)$ is away from the image center $(C_x, C_y)$, e.g., the first coordinate pair, the object world coordinate is $(x_w, y_w, z_w)$.

ii) Pick the sign of $T_y$ to be +1.

iii) Compute the following using $a_1$ through $a_7$ from Step 5:

$R_{11}=a_1 T_y$
   $R_{12}=a_2 T_y$ $R_{21}=a_5\ T_y$ $R_{22}=a_6\ T_y$ $x=R_{11}x_w+R_{12}y_w+T_x$ $y=R_{21}x_w+R_{22}y_w+T_y$ iv) IF ((x and $x_f$ have the same sign) and (y and $y_f$ have the same sign)), THEN sgn($T_y$)=+1, ELSE sgn ($T_Y$)=−1.

7. Compute R and $T_x$:

$R_{11}=a_1\ T_y/s_x$ $R_{12}=a_2\ T_y/s_x$ $R_{13}=a_3\ T_y/s_x$ $R_{21}=a_5\ T_y$ $R_{22}=a_6\ T_y$ $R_{23}=a_7\ T_y$ $T_x=a_4\ T_y/s_x$

The 3rd row of R is computed as the cross product of the first two rows using the right hand rule.

8. Compute approximation of f and T, by ignoring lens distortion: For each image/world coordinate pair i, $$[R_{21}x_{wi} + R_{22}y_{wi} + T_y - d_y Y_{di}]\begin{bmatrix} f \\ T_z \end{bmatrix} = (R_{31}x_{wi} + R_{32}y_{wi})d_y Y_{di}$$

With several other calibration pairs, this yields an overdetermined system of linear equations that are solved for f and $T_z$.

9. Compute exact solution for f, Tz, and k:
   Solve this equation:

$$d_y Y_d + d_y Y_d k\left((s_x^{-1} d_x X_d)^2 + (d_y Y_d)^2\right) = f * \left(\frac{R_{21}x_w + R_{22}y_w + R_{23}z_w + T_y}{R_{31}x_w + R_{32}y_w + R_{33}z_w + T_z}\right)$$

with f, $T_z$, and k as unknowns using standard optimization scheme such as steepest descent. Use the approximation for f and $T_z$ computed in Step 8 and 0 for k as the initial guesses.

Upon completion of the camera calibration, two formulas (equations), having three unknowns, may be generated. These formulas use the definitions and the results obtained above. Using these formulas, one may solve for the 3D world coordinates ($x_w$, $y_w$, $z_w$) which correspond with any camera image coordinate ($x_f$, $y_f$). However, because there are only two equations, but there are three unknown, the solution is in the form of a ray, or line, rather than a point. The formulas which may be generated are:

$(x_u R_{31}-fR_{11})x_w+(x_u R_{32}-fR_{12})y_w+(x_u R_{33}-fR_{13})z_w+(x_u T_z-fT_x)=0$ $(y_u R_{31}-fR_{21})x_w+(y_u R_{32}-fR_{22})y_w+(y_u R_{33}-fR_{23})z_w+(y_u T_z-fT_y)=0$ where $x_u=x_d+D_x$ $y_u=y_d+D_y$ and $x_d=d_x(x_f-C_x)/s_x$ $y_d=d_y(y_f-C_y)$ and $D_x=x_d k(x_d^2+y_d^2)$ $D_y=y_d k(x_d^2+y_d^2)$.

The second part of the preferred calibration process is a light sheet calibration, to determine the equation for the light sheet in terms of 3D world coordinates. When used in combination with the equations above, this allows for a determination of the 3D world coordinate ($x_w$, $y_w$, $z_w$) point which corresponds to a given camera image coordinate ($x_f$, $y_f$), i.e. it provides a third equation to solve for the third unknown. The light sheet calibration need only be done with one of the cameras since the light sheet equation is the same for both cameras.

Referring now to FIG. 12B, in the best mode embodiment, the light sheet calibration is performed on a planar surface perpendicular to one of the coordinate system axes defined by the calibration block, preferably, on the top metallic surface 580 of the calibration block, next to and parallel to the grid. This surface is perpendicular to the z-axis 565. Its z-axis location is precisely known via the translation stage 545. The sensor 50 (FIG. 1) is positioned over the translation stage 545 such that the cameras 65, 70 and laser 105 are situated about as shown, with the laser 105 projecting a light sheet that illuminates a stripe 585 on the top metal section, in view of both the cameras 65, 70. The position of the sensor relative to the calibration block should not change between camera calibration and light sheet calibration, other than a translation in x or y (or combination). The fiber optic light source 570 is turned off. The translation stage 545 is used to translate the surface to about ten precisely known positions along the z-axis 565. At each z axis position, an image from a camera is digitized and processed (FIG. 5 subroutines 240, 245, 250, 255, 260) to determine a group of camera image coordinates ($x_f$, $y_f$) representing the light stripe. For each camera image coordinate pair ($x_f$, $y_f$), a corresponding 3D world coordinate point ($x_w$, $y_w$, $z_w$), is determined. This is done by setting $x_w$ equal to the z-axis position of the translation stage 545, and solving for $x_w$ and $y_w$ using the two equations obtained from the camera calibration.

A least squares fit is performed on four or more of the 3D world coordinate points, to obtain the coefficients for the light sheet equation below, which should be recognized as an equation for a plane:

$$ax_w+by_w+cz_w+d=0$$

Once all three calibration equations have been obtained, image coordinates ($x_f$, $y_f$) may be converted to 3-D world coordinates ($x_w$, $y_w$, $z_w$) by obtaining a solution for the three forementioned equations and three unknowns ($x_w$, $y_w$, $z_w$). This system of equations can be solved by any standard technique such as Gauss Elimination. They can be solved at run time for each point ($x_f$, $y_f$) by first converting to ($x_u$, $y_u$). However it is more efficient to solve the equation symbolically using ($x_u$, $y_u$) ahead of time to reduce the number of arithmetic operations during run time. After solving the equations symbolically, the following equations are obtained:

$x_w=(C_{xx}x_u+C_{yx}y_u+C_x)/(C_{xd}x_u+C_{yd}y_u+C_d)$ $y_w=(C_{xy}x_u+C_{yy}y_u+C_y)/(C_{xd}x_u+C_{yd}y_u+C_d)$ $z_w=(C_{xz}x_u+C_{yz}y_u+C_z)/(C_{xd}x_u+C_{yd}y_u+C_d)$ where the parameters $C_{xx}$, $C_{yx}$, $C_x$, $C_{xy}$, $C_{yy}$, $C_y$, $C_{xz}$, $C_{yz}$, $C_z$, $C_{xd}$, $C_{yd}$, and $C_d$ are calculated from the calibration parameters and are stored in memory to be used for the mapping process.

Because the profile is 2D and the profile processing algorithms (FIG. 5 subroutines 290, 375, 390, 420) are designed for use with a 2D profile, a mapping from the 3-D world coordinates to 2-D coordinates is used. Since the profile lies in the general plane of the light sheet, a linear transformation of the sensor's coordinate system is done so that one axis of the coordinate system is perpendicular to the sheet of light. It should be understood that although the 2-D coordinates are not the actual physical coordinates of the physical coordinates of the profile, they are still generally indicative of such.

Any axis can be chosen as the one that is perpendicular to the plane of the light sheet. Here the y-axis is chosen. Thus after transformation, y is a constant, and only the x and z components are needed to describe the profile. The linear transformation is a rotation about the x-axis, $\theta$, of the sensor coordinate system followed by a rotation about the new z-axis, $\phi$. Using the coefficients of the light plane equation, $ax_w + by_w + cz_w + d = 0$, the following angles are computed:

$$\theta = \pi - \sin^{-1}(c/(a^2+b^2+c^2)^{1/2}) \text{radians}$$

$$\phi = \sin^{-1}(-a/((a^2+b^2+c^2)^{1/2} * \cos(\theta))) \text{radians}$$

However, if $\cos(\theta)*\cos(\phi)*b > 0$ then $$\phi = \pi - \phi \text{ radians}$$

Using $\theta$ and $\phi$, the above described linear transformations are applied to the 3D world coordinates $(x_w, y_w, z_w)$ or equations for such, to obtain equations for coordinates in a 2D coordinate system e.g., $(x_{w'}, z_{w'})$.

It has been determined that a refinement, or minor adjustment, in the calibration can be achieved without going through the process of recalibration. Such a refinement requires an artifact, i.e. an object similar to that for which the profile is to be determined, and for which the profile is precisely known in advance. The sensor is placed on the artifact and the profile is determined as described hereinabove. The width is determined at various locations, and compared to expected widths. Discrepancies between the sensor values and the expected values may be assumed due to calibration error. The calibration may be refined by calculating the average discrepancy and modifying the calibration parameters accordingly.

While the optical instrumentation is described above in terms of preferred positioning and orientation, that is not to the exclusion of any other suitable, albeit possibly less optimal positioning and orientation. The light may be visible or not visible. Furthermore, while the sensor above uses one or more extended brackets for locating the sensor to the airfoil, this is not to the exclusion of other means for locating the sensor, whether housed or not.

Although the best mode embodiment discloses a light source having two mirrors, the light source may have more than two mirrors. As an alternative to a single laser and mirrors, more than one light source, e.g. a pair of lasers on opposite sides of the airfoil, may be used to project the sheet at the edge. Some applications may require even more than two light sources suitably positioned so as to adequately illuminate desired portions, contiguous or non contiguous, of the profile. The light sources should have high enough intensity to facilitate suitable imaging. The sources should be aligned with each other such that the projected sheet is generally planar, preferably substantially planar, within the target area. If a pair of lasers are used with a blade edge, or similar object, the lasers may be directed somewhat downward on the edge, to provide greater illumination of the outer portion 40 of the edge 35 than if straight on. Alignment of the pair may be accomplished prior to usage on a blade edge, by placing a translucent or opaque target in the target area and adjusting the laser projection angles.

It should be obvious that, although the present invention is disclosed in terms of a best mode embodiment which uses a pair of black and white video cameras, the present invention may be used with other types of optical detectors. Furthermore, the present invention may comprise more than two optical detectors, collectively viewing the profile, whereby each has a different observation view and views a different portion of the illuminated profile than the others. The optical detectors should generally be positioned to get a good view of their respective portion.

While the present invention uses a image processor having an industrial computer, an image processing board and a program in memory, the present invention may be practiced with various embodiments including software in any type of storage media, inside or outside of the image processor, hardware or firmware implementations, and combinations of the above. The image processor may have more features than above, for example it may comprise an image processing board for each camera, or less than all the features described above, such as where a digital camera is used, the image processor will not need a digitizer. The image processor may be distributed throughout the apparatus. The image processor may function in any suitable manner that allows it to process signals and determine the profile. Of course, evaluation of the profile need not be carried out by the same processor as that which generates the profile.

The transformation may be from image coordinates to 3D coordinates or image coordinates to 2D coordinates. The transformation should interrelate the camera views, directly or indirectly, so the views can eventually be combined. Furthermore, while the mapping may be embodied in a transformation equation, this is not to the exclusion of other ways for using information derived from calibration, for example a look up table (residing in memory which for each coordinate location in the view, has stored an associated coordinate in a common reference system) to correlate the points in each view to points in a common reference system. So long as the transform is able to determine which coordinates are associated with each camera, the transformation of the coordinates may occur in any order and the output may be kept separate or combined. It should be recognized that normally, only the extracted image coordinates, representing the profile in the view, are transformed in order to minimize the number of transformations. However, if desired, an entire image could be transformed, in which case, profile extraction may be carried out after transformation. The transformation is preferably performed on digital signals, but it is conceivable that it could also be performed on analog signals. The output of the transformation need not be further processed.

Still further, the disclosed calibration procedure and associated equations for using the calibration data is just one example of such, and is not to the exclusion of other calibration procedures and methods for determining the calibration parameter. Although in the best mode embodiment, the images are processed simultaneously, or in close succession, the present invention is not limited to such.

Although the present invention is disclosed in terms of a best mode embodiment for obtaining the profile of an edge of an airfoil, the present invention may be used to obtain the profile of any surface or object, including but not limited to elongated surfaces, surfaces having an edge, surfaces having an elongated edge, cylindrical objects, boxlike objects, somewhat flat surfaces with surface-like features, and combinations of the above. This includes both the leading and the trailing edges of any airfoil. Furthermore, although the present invention is disclosed in terms of one sensor that can determine the profile at any location, it should be obvious that more than one sensor may be used simultaneously on the airfoil.

While the particular invention has been described with reference to embodiments for determining the profile of a fan blade, this description is not meant to be construed in a limiting sense. It is understood that various modifications of the above embodiments, as well as additional embodiments of the invention, will be apparent to persons skilled in the art upon reference to this description, without departing from the spirit of the invention, as recited in the claims appended hereto. It is therefore contemplated that the appended claims will cover any such modifications or embodiments as fall within the true scope of the invention.

What is claimed is:

1. An apparatus for evaluating a profile of a blade edge in a system having a processor for such evaluation, the edge comprising an edge tip and two edge sides, the apparatus comprising:

means for illuminating the blade edge, at a location along the blade, with a light stripe;

means for capturing an image of each illuminated edge side;

means for combining the image data, using calibration parameters, to represent the profile of the entire edge, including the tip, said profile being represented by a plurality of data points in a coordinate system, means for providing a profile tolerance band, said profile tolerance band including data points corresponding to the edge tip and two sides;

means for aligning the profile and said profile tolerance band, said profile including data points from edge sides and an outermost portion of said blade;

means for providing a plurality of memory locations for storing values, each of said memory locations being associated with a point in the coordinate system;

means for setting said value stored in each of said memory locations, where those not associated with points of said tolerance band are set to a first value, and those associated with points of said tolerance band are set to a second value; and means for determining whether the points of the profile are within said tolerance band by evaluating said value of said memory locations which are associated with points of the profile.

2. A method for evaluating a profile of a blade edge in a system having a processor for such evaluation, the edge comprising an edge tip and two edge sides, the method comprising the steps of:

illuminating the blade edge, at a location along the blade, with a light stripe;

capturing an image of each illuminated edge side;

combining the image data, using calibration parameters, to represent the profile of the entire edge, including the tip, said profile being represented by a plurality of data points in a coordinate system, providing a profile tolerance band, said profile tolerance band including data points corresponding to the edge tip and two sides;

aligning the profile and said profile tolerance band, said profile including data points from edge sides and an outermost portion of said blade;

providing a plurality of memory locations for storing values, each of said memory locations being associated with a point in the coordinate system;

setting said value stored in each of said memory locations, where those not associate with points of said tolerance band are set to a first value, and those associated with points of said tolerance band are set to a second value; and determining whether the points of the profile are within said tolerance band by evaluating said value of said memory locations which are associated with points of the profile.

3. The method of claim 2 wherein said step of determining comprises evaluating said value of said memory locations which are associated with points of the profile, where if said value is equal to said second value then the profile is within said tolerance band, if said value is equal to said first value, then the profile is out of said tolerance band.

4. The method of claim 2 wherein said step of setting comprises setting said value of all of said memory locations to said first value, and then revising said value of said memory locations that are associated with points of said tolerance band to said second value.

5. The method of claim 2 further comprising the step of changing the value stored in said memory locations associated with points of the profile, to a value that reflects the results of said step of evaluating, where said value is changed to a third value if the profile is within tolerance, or a fourth value if the profile is out of tolerance.

6. The method of claim 2 wherein said memory locations are those of a video display and said values represent a color at a location on said display of said video display.

7. The method of claim 2 wherein said plurality of memory locations comprises a first plurality of memory locations, the method further comprising the steps of:

providing a second plurality of memory locations for storing values, each of said memory elements being associated with a point in a coordinate system;

setting said value stored in each of said second memory locations, where those not associated with points of said profile are set to a third value, and those associated with points of said profile band are set to a fourth value;

wherein said step of determining comprises performing a logical function on the values stored in a pair of said memory locations, one from each of said first and second plurality of memory locations, where said pair are each associated with the same point in said coordinate system.

8. The method of claim 7 wherein said first, second, third and fourth values comprise binary values.

9. A method for evaluating a profile of a blade edge of a blade of a gas turbine engine in a system having a processor for such evaluation, the profile having a tip and two sides, one of the two sides being flatter than the other, the profile being represented by a plurality of data points in a plane within a coordinate system, the method comprising the steps of:

rotating the profile to orient it such that one of the two sides is substantially parallel to a coordinate axis within said plane;

determining which point represents the tip by determining which point has an extreme most coordinate value in one direction along said coordinate axis;

wherein said step of rotating the profile further comprises the steps of:

locating a relatively flat section of one of the two sides of the profile;

determining a equation of a line representing the relatively flat section; and rotating the profile to orient it such that said line representing the relatively flat section is substantially parallel to a coordinate axis.

10. The method of claim 9 wherein the one side of the profile is the flatter of the two sides of the profile.

11. The method of claim 10 further comprising the step of determining the width of the profile at a distance from the tip.

* * * * *